May 25, 1965

LE ROY R. BOGGS 3,185,746

METHOD FOR INITIATING AN OPERATION OF MAKING FIBER
REINFORCED PLASTIC PIECES

Filed Sept. 15, 1961

INVENTOR
LE ROY R. BOGGS
BY
Synnestvedt + Lechner
ATTORNEYS

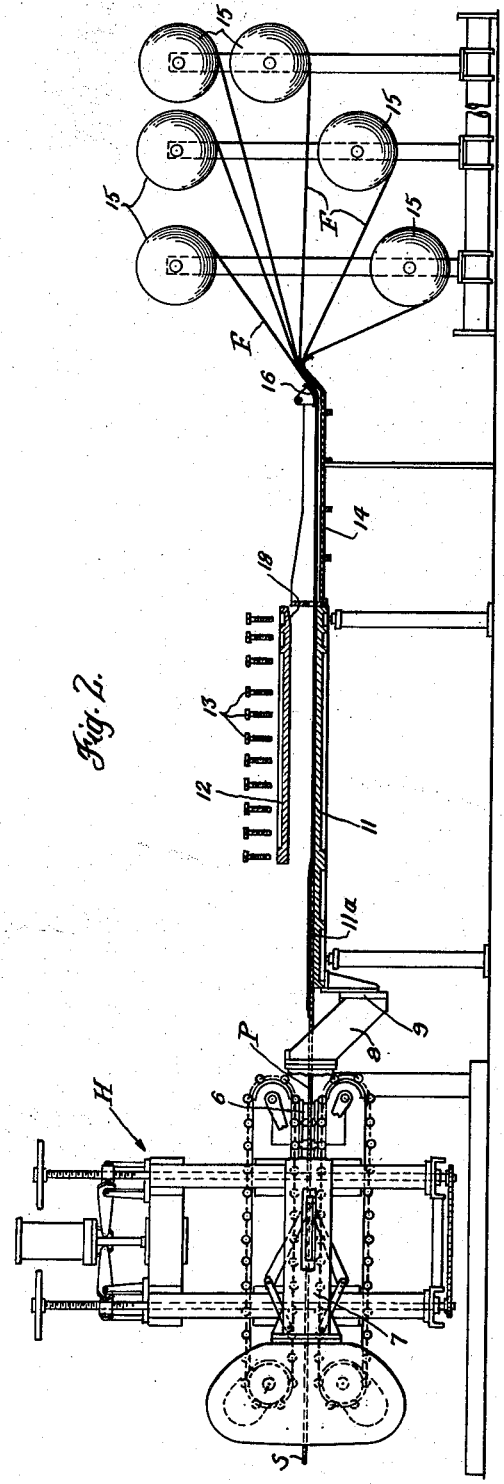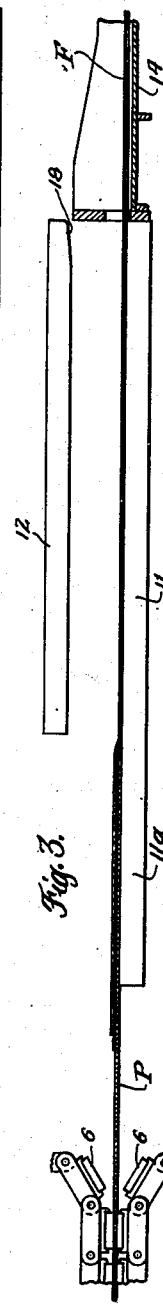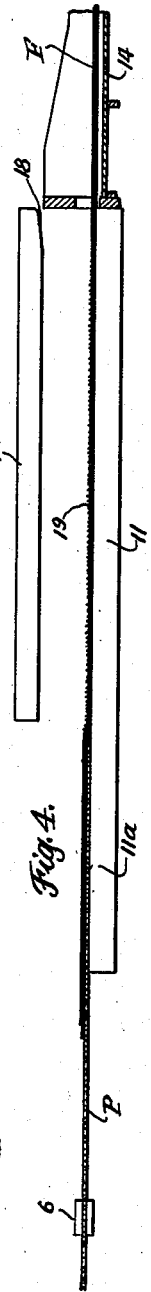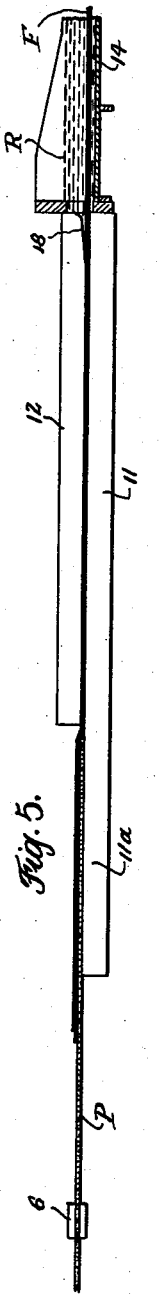

United States Patent Office 3,185,746
Patented May 25, 1965

3,185,746
METHOD FOR INITIATING AN OPERATION OF MAKING FIBER REINFORCED PLASTIC PIECES
Le Roy R. Boggs, Bristol, Tenn., assignor to Universal Moulded Fiber Glass Corp., Bristol, Va., a corporation of Delaware
Filed Sept. 15, 1961, Ser. No. 138,350
8 Claims. (Cl. 264—137)

This invention relates to a method for use in connection with the production of elongated pieces or shapes composed of fiber reinforced plastic materials; and the invention is especially concerned with certain techniques for initiating a forming operation of the type in which fiber reinforcement impregnated with a thermosetting resin material in liquid form is drawn through a forming die by a puller mechanism engaging the formed piece beyond the exit end of the forming die.

Forming operations of the general type referred to above are disclosed in my copending applications Serial Number 2760, filed January 15, 1960 and Serial Number 44,050, filed July 20, 1960 and Serial Number 115,633 filed June 8, 1961, and in accordance with those disclosures, in a typical operation, a fiber reinforcement, for instance a strip or mat of glass fibers is passed through a reservoir or bath of liquid heat-settable resin material. The impregnated mat passes into a forming die having a confining passage or channel at least a portion of which is of uniform cross section conforming with the cross sectional shape of the piece being made and in which portion heat is applied so as to set or harden the resin. The formed piece emerging from the exit end of the die is engaged by a puller mechanism which serves to draw or feed the materials being formed through the system.

Once an operation of this general kind has been established, it may readily continue without difficulty and without interruption, virtually indefinitely or at least for considerable lengths of time. However, because of the arrangement of this system, especially with the feed or puller mechanism located beyond the exit end of the forming device, and further because of the nature of the materials being used, special arrangements are important in initiating or starting the operation.

Although it is desirable in the production of many articles and shapes capable of being produced by a method of the kind described to employ fiber reinforcing elements or pieces, for instance strips or matted fibers, which do not have any appreciable tensile strength by themselves, it is virtually impossible to initiate an operation of the kind referred to merely by threading through the system a strip or mat of fibers and pulling on such a strip of fibers alone by the puller mechanism. The mat material does not by itself have adequate tensile strength to pull a piece being formed through the die during the forming operation.

With the foregoing and other starting problems in mind, the present invention makes provision for special arrangements with regard to a method for initiating an operation of the kind referred to.

In a typical starting procedure according to the invention a preformed solid "pilot" piece is used in the starting procedure, this piece being placed in the puller mechanism with the trailing end thereof projecting from the puller mechanism toward but not into the forming die. A fiber reinforcement is then threaded through the system to a position so as to lap the trailing end of the "pilot" piece and the lapped joint is adhesively bonded.

Preferably also in the starting procedure at least one fiber reinforcement element is employed having greater strength than the mat type of material. For example, in the starting procedure I prefer to employ at least some woven fabrics or rovings, or both, because of their greater tensile strength, and to use such stronger reinforcement elements during the starting operation, although these may ordinarily be terminated when the operation has been established and is stabilized. This is advantageous in cases where glass fiber reinforcement is being used in the article being formed because the glass fiber mat has very low strength by itself.

Certain other aspects of the preferred starting technique, and also of the equipment used for the purpose of initiating the operation can best be explained after more detailed and specific consideration of a typical embodiment of the invention. Therefore, further consideration of the starting procedure itself and of the advantages thereof will be deferred until after the following description of the accompanying drawings which will illustrate a preferred equipment of the type suitable for carrying out the method of the kind referred to including the starting or initiating operation. In the drawings:

FIGURE 2 is a side elevational view of certain parts shown in FIGURE 1, with some parts shown in vertical section and with other parts shown in outline form or diagrammatically; and FIGURES 3, 4 and 5 are views of certain parts shown in FIGURE 2 but on a large scale and representing several stages in the starting procedure according to the present invention.

Figure 1:
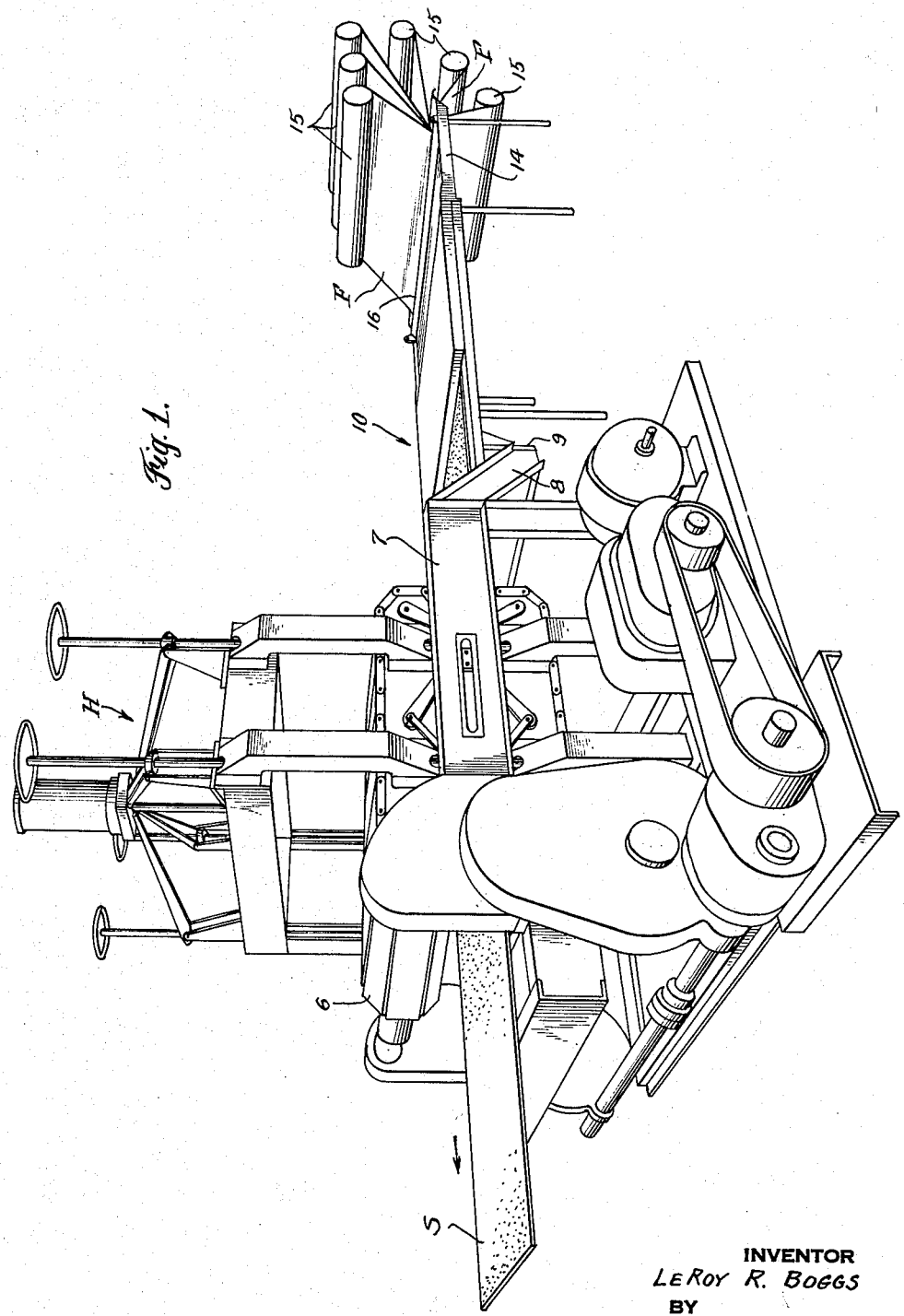
FIGURE 1 is a general overall prospective view of a machine of the kind here involved, particularly arranged for the production of strip or sheet material of substantial width, for instance up to 4 or 5 feet in width.

Referring first to the apparatus or equipment as a whole shown partly in FIGURES 1 and 2, the puller mechanism is of the crawler tread type including two sets of tread shoes 6 arranged to travel in endless chain fashion above and below the sheet being formed which is indicated at S in FIGURE 1. These tread shoes 6 engage the upper and lower surfaces of the sheet and draw the sheet and also the forming materials through the apparatus. The crawler treads are arranged to be yieldingly urged toward each other under considerable pressure for instance by a hydraulic system generally indicated by the letter H, so as to frictionally grip the sheet being formed, but the mechanism serving this purpose need not be considered in detail herein as it forms no part of the present invention per se. It will of course be understood that the crawler treads are driven, for instance by the drive mechanism appearing in the foreground of FIGURE 1.

The frame structure 7 for the crawler mechanism is provided with brackets 8 which project from the frame at the intake end of the puller mechanism and serve to carry an abutment or thrust plate 9 to which the die structure is connected and against which the thrust involved in pulling the sheet being formed through the die is transmitted to the frame of the puller mechanism. The die structure is generally indicated at 10 in FIGURE 1, and, as seen in FIGURE 2, this die structure comprises a lower die part 11 and an upper separable die part 12, the die parts being shown assembled in operating position in FIGURE 1 but being illustrated separated in FIGURE 2. The two die parts are adapted to be bolted together by a series of bolts shown in FIGURE 13 which are arranged in two series along the two edges of the die structure. When bolted together the two die parts define a confining passage or channel in which the article is formed by curing the resin. In advance of the die structure (to the right as viewed in the figures) is a reservoir or resin pan 14.

Webs or strips F of fiber reinforcing material are adapted to be supplied or fed from spools or reels 15, there being six of these shown in FIGURES 1 and 2 and all six of these webs pass into the resin pan under a guide 16. The webs are impregnated in the resin pan with a liquid heat hardenable or thermosetting material and the impregnated webs pass into the entrance end of the confining passage formed between the die parts 11 and 12 when assembled as indicated in FIGURE 1. The die parts are shaped to provide a confining passage or channel of uniform cross section throughout most of the length of the die, which cross section conforms with the cross section of the piece or sheet being formed. This portion of the die is heated, for instance by heater elements embedded within the die structure itself, in order to raise the temperature of the resin material passing through the die structure and to set or harden the resin therein. The piece being formed issues from the exit end of the die passage in solidified or hardened form and the solid piece is engaged by the puller mechanism which serves to advance the materials and the piece as it is being formed through the system.

Preferably, the entrance end portion of the die is tapered to an enlarged inlet end, this being accomplished by the taper indicated at 18 in FIGURES 2, 3, 4 and 5. This tapered inlet end portion of the die is also preferably cooled, for instance by means of cooling passages provided for the circulation of a cooling medium, and in operation as the reinforcement elements pass through the resin in the resin pan 14, they are impregnated with an excess of resin material which excess is ejected and returned to the resin pan by the action of the entrance end portion of the die structure. As the impregnated and compressed fiber reinforcement advances into the heated area of the die, the heat hardens the resin while it is in the portion of the die of uniform cross section, and the solidified piece emerges from the exit end of the die, as above already mentioned.

In a typical operation for making a sheet of the type indicated in FIGURE 1, for instance a structural sheet, for example of four foot width and ¼ inch thickness, at least some of the fiber reinforcement elements F may comprise mats of fibers, advantageously glass fibers. Some other types of reinforcement elements may also be included, for instance a web of woven fibers or threads composed of fibers, for instance glass fibers. In any event, all of such fibrous reinforcement elements have relatively low tensile strength, in view of which it would be difficult to initiate the operation, merely by threading the fiber reinforcements through the resin pan, the die structure and the puller mechanism, and then starting the apparatus.

Having in mind the nature of the operation described above and various of the problems encountered in the starting of such an operation, the present invention contemplates certain special starting techniques. While these techniques may be varied somewhat depending upon the kind of reinforcement element employed, the shape of the part being made, and other factors, the techniques can best be illustrated by explaining a typical starting operation in a machine of the kind shown in the drawings.

To initiate the operation the upper part of the die structure 12 is separated from the lower part as shown in FIGURES 2, 3 and 4. A "pilot" piece indicated in FIGURES 2 to 5 at P is placed in the puller mechanism with the trailing end thereof projecting over the support 11a of the lower die part. It will be noted that this support 11a is a part of the lower die part 11 which projects beyond the exit end of the confining passage in the die structure. The part 11a in effect constitutes a table on which the "pilot" piece P and other elements are lap jointed and preferably bonded together.

The "pilot" piece may comprise either a previously formed piece of the sheet or strip material such as indicated at S in FIGURE 1 or, if no such piece is yet available, the "pilot" piece may comprise any other suitable structure conforming or approximately conforming with the cross section of the piece to be made, for instance, in the case of sheet material such as that described above, the "pilot" piece may readily be composed of or cut from a sheet of plywood.

With the upper die part 12 separated, and without resin in the resin pan, the reinforcing strips or webs F are threaded through the apparatus to a point where the leading ends thereof are lapped with the trailing end of the piece P, this lapping being illustrated in FIGURES 2 to 5 inclusive. The lapped parts are then adhesively bonded together. This may be accomplished by the employment of any suitable adhesive or glue. However, conveniently the bonding is accomplished by doping onto the joint a thermosetting resin material of the general kind to be employed in the process, although here it is preferred that the resin material be so formulated that it will set in a reasonable time without requiring any appreciable elevation in temperature above room temperature. This same type of resin, formulated as just mentioned, is also desirably applied to the run of the reinforcement fibers F lying in the position of the die itself, this being indicated at 19 in FIGURE 4. Use of a room setting resin material in a starting procedure of the kind here involved is also disclosed in my copending application Serial Number 44,050 above referred to, and the present application is a continuation-in-part of that prior application.

While the resin 19 is still liquid or at least quite soft, the upper die part 12 is brought down and fastened in place as indicated in FIGURE 5. The materials and equipment are then permitted to remain idle for an interval without heating the die until the room temperature thermosetting resin applied both at 19 and also to the lapped joint on the table or support 11a has hardened.

The resin may be introduced into the resin pan at any convenient time after the die part 12 is fastened down. This is indicated at FIGURE 5 where the resin is shown at R and it will be noted that the resin pan is filled to a level sufficient to completely immerse the inlet opening to the die. After the resin applied at 19 and also on the lapped joint has hardened the die is heated and the crawler tread mechanism is started. The pilot piece is thereby advanced by the puller mechanism and the lapped joint is fed through the puller mechanism and this causes advancement of the materials in the die itself and also commences the operation of pulling the fiber reinforcement webs from the supply spools 15 through the resin pan 14.

In the foregoing operation it is desirable that the resin applied at 19 be terminated short of the area of the die corresponding to the tapered inlet end portion thereof. This is desirable in order to avoid setting or hardening of resin in the entrance end portion of the die which is enlarged as compared with the remainder of the die passage. The hardening of resin in such an enlargement would tend to cause breakage of the piece because of the difficulty of drawing the already hardened material from the enlarged entrance end in the portion of the die into the passage of smaller cross section.

The reinforcement webs F in the region of the tapered entrance end of the die may even be present without any appreciable impregnation with resin at the time of initiation of the operation. At most, this would represent only a very short length of dry fibers and this factor tends to avoid necking down and consequent breakage of the fibrous material. In any event, the system may effectively be started in the manner described above and the operation may continue for appreciable lengths of time or even indefinitely without breakage or shut-down.

In connection with the foregoing, certain variations in procedure may be adopted, including those mentioned herebelow.

First, it is to be noted that where the fiber reinforcing elements to be employed in the piece being made are composed of matted fibers, rather than woven webs or rovings, it is advantageous in the formation of many pieces, since the matted webs or strips are of quite low tensile strength, to employ at least some woven webs during the startup operation. These may be used in addition to or in place of the matted webs during the starting procedure. Rovings may also desirably be employed for starting purposes particularly where relatively low tensile strength mat is employed for the normal reinforcement in the article being made.

As another alternative, the surfaces of the die structure may be covered with a layer or coating of certain materials to decrease the surface friction during the starting of the operation. For this purpose it is contemplated to use sheets or strips of cellophane or a lubricating coating of wax or silicone grease at the die surfaces in order to facilitate initiation of the sliding motion of the piece being formed. Such a lubricating coating may be first applied and then a cellophane layer interposed between the lubricated surface and the materials laid in the die to initiate the operation.

The resin material employed, as above indicated is of the thermosetting or heat hardenable type, and preferably comprises a polyester type resin. As is known, such polyester resins, sometimes also referred to as alkyd resins, are formed by reaction of a dibasic acid with a polyhydric alcohol. Those of the reaction products formed in this way which have unsaturation in the molecule are used in the formulation of thermosetting polyester resin materials, the unsaturated reaction product being used in combination with a cross linking agent, usually a monomer such as:

Styrene
Diallyl phthalate
Vinyl toluene
Methyl methacrylate
Triallyl cyanurate

Resin materials of the kind referred to are relatively stable at room temperature, and depending upon the proportions of ingredients, comprise a more or less mobile liquid. When a quantity of the resin material is to be used in the process, a hardener or accelerator is also preferably present, for instance benzol peroxide.

Advantageously the resin material employed also incorporates a comminuted wax, for instance Carnauba wax in an amount ranging from 0.1% up to about 5% as is disclosed in my copending application Serial Number 120,690, filed June 29, 1961.

A similar resin material may be employed for the room temperature type thermosetting hereinabove referred to. However, in order to alter the setting or curing characteristics of the resin and thereby provide for setting thereof at room temperature within a reasonable time, the resin material should have added thereto an activator, for instance cobalt naphthenate, alkyl mercaptans, or dialkyl aromatic amines. This latter type of room setting resin is desirably used in the start-up procedure for impregnation of the portion of the reinforcement which lies in the die structure beyond the tapered inlet end portion. It may also be used as the adhesive for bonding together the lapped materials applied to the support 11a.

I claim:

1. A method for initiating the operation of making an elongated piece composed of fiber reinforced plastic material in a machine having a multi-separable part forming die and a mechanism for pulling the formed piece through the die, which method comprises placing an elongated fiber reinforcement in the position of the die with the parts of the die separated and with the reinforcement extended both in advance of the entrance end of the die and beyond the exit end of the die, lap jointing the leading end of the reinforcement beyond the exit end of the die with the trailing end of a pilot piece adapted to be engaged by the puller mechanism, adhesively bonding the lapped joint, applying a liquid thermosetting resin to the fiber reinforcement in the position of the die, bringing the seperated die parts together, impregnating the fiber reinforcement with a liquid thermosetting resin in advance of the die, heating the die, and operating the puller mechanism to initiate the operation.

2. A method for initiating the operation of making an elongated piece composed of fiber reinforced plastic material in a machine having a multi-separable part forming die and a mechanism for pulling the formed piece through the die, which method comprises placing an elongated fiber reinforcement in the position of the die with the parts of the die separated and with the reinforcement extended both in advance of the entrance end of the die and beyond the exit end of the die, lap jointing the leading end of the reinforcement beyond the exit end of the die with the trailing end of a pilot piece adapted to be engaged by the puller mechanism, adhesively bonding the lapped joint, applying to the fiber reinforcement in the position of the die a liquid thermosetting resin adapted to set at a temperature appreciably lower than that used to set the resin hereinafter referred to, bringing the separated die parts together before said resin has set, impregnating the fiber reinforcement in advance of the die with a liquid thermosetting resin adapted to set at a temperature considerably elevated above room temperature, after said first resin has set heating the die to a temperature sufficient to set said second resin, and operating the puller mechanism to advance the pilot piece and thus initiate the operation.

3. A method according to claim 1 in which the die used in making the elongated piece has a die passage having a portion of uniform cross section conforming with the cross section of the piece being made and an entrance end portion tapered to an enlarged inlet end opening, and in which method the application of the first mentioned liquid resin is restricted to that portion of the fiber reinforcement lying in the position of the portion of the die passage of uniform cross section.

4. A method according to claim 1 in which said pilot piece comprises a piece of the same cross section made by a previous operation in said die.

5. A method for initiating the operation of making an elongated piece composed of plastic material reinforced with a fibrous mat in a machine having a forming die and a mechanism for pulling the formed piece through the die, which method comprises placing a woven fiber reinforcement in the path of feed through the die projecting both beyond the exit end of the die and in advance of the inlet end of the die, connecting the leading end of the woven reinforcement with the trailing end of a pilot piece adapted to be engaged by the puller mechanism, impregnating the woven reinforcement in advance of the die with a heat hardenable liquid resin material, heating the die to harden said resin as it passes through the die, feeding both said impregnated woven reinforcement and also fibrous mat reinforcement impregnated with the same resin material into and through the die until a portion of the formed article containing fibrous mat reinforcement reaches and is engaged by the puller mechanism, and thereafter terminating the feed of said woven reinforcement.

6. A method for initiating the operation of making an elongated piece composed of plastic material reinforced with a fibrous material in a machine having a forming die and a mechanism for pulling the formed piece through the die, which method comprises placing a fibrous reinforcement in the path of feed through the die with parts projecting both beyond the exit end of the die and in advance of the inlet end of the die, connecting the leading end of the fibrous reinforcement with the trailing end of a pilot piece adapted to be engaged by the puller mechanism, impregnating the fiber reinforcement in advance of the die with a heat hardenable liquid resin material, heating the die to harden said resin as it passes through the die, and thereafter starting the pulling mechanism.

7. A method for initiating the operation of making an elongated piece composed of plastic material reinforced with a fibrous material in a machine having a forming die and a mechanism for pulling the formed piece through the die, which method comprises placing a fibrous reinforcement in the path of feed through the die with parts projecting both beyond the exit end of the die and in advance of the inlet end of the die, connecting the leading end of the fibrous reinforcement with the trailing end of a pilot piece adapted to be engaged by the puller mechanism, impregnating the fibrous reinforcement in the position of the die with a liquid resin material which is settable at room temperature, impregnating the fiber reinforcement in advance of the die with a liquid resin material requiring application of heat above room temperature for setting purposes, operating the puller mechanism to advance the impregnated fiber reinforcement through the die, and heating the die to harden the heat hardenable liquid resin material as it passes into and through the die.

8. A method according to claim 5 in which the die used in making the elongated piece is of multi-separable part construction, in which die parts are separated during the placing of the woven reinforcement in the path of feed through the die, in which the portion of the woven reinforcement lying in the position of the die is impregnated with resin material and in which the die parts are thereafter brought together.

References Cited by the Examiner

UNITED STATES PATENTS

| | | | |
|---|---|---|---|
| 2,399,422 | 4/46 | Back | 18—4 XR |
| 2,716,778 | 9/55 | Beare | 18—13 XR |
| 2,863,168 | 12/58 | Buckley et al. | 264—137 XR |
| 2,977,630 | 4/61 | Bazler | 18—45 |

ROBERT F. WHITE, *Primary Examiner.*

WILLIAM J. STEPHENSON, ALEXANDER H. BRODMERKEL, *Examiners.*